United States Patent [19]

Tarrant

[11] 4,102,067
[45] Jul. 25, 1978

[54] COMBINED GREETING CARD AND MUSIC BOX STRUCTURE

[76] Inventor: Fred A. Tarrant, 9661 Skylark Blvd., Garden Grove, Calif. 92641

[21] Appl. No.: 730,266

[22] Filed: Oct. 6, 1976

[51] Int. Cl.² ............................................. G09F 27/00
[52] U.S. Cl. .................................... 40/455; 40/152.1; 84/95 C
[58] Field of Search ................. 40/28.1, 124.1, 152.1, 40/156, 152.2, 102, 104.02; 35/8 A, 35 E; 84/94 C, 95 C; 281/31

[56] References Cited

U.S. PATENT DOCUMENTS

| | | | |
|---|---|---|---|
| 249,198 | 11/1881 | Moon | 40/104.02 |
| 428,795 | 5/1890 | Von Auw | 84/94 C X |
| 2,072,167 | 3/1937 | Graham | 40/152.1 |
| 3,665,629 | 5/1972 | Shore | 40/156 |
| 3,798,806 | 3/1974 | Sanford | 40/28.1 |

FOREIGN PATENT DOCUMENTS

| | | | |
|---|---|---|---|
| 627,250 | 9/1961 | Canada | 84/95 C |
| 762,529 | 11/1956 | United Kingdom | 84/95 C |

*Primary Examiner*—John F. Pitrelli
*Attorney, Agent, or Firm*—William C. Babcock

[57] ABSTRACT

A combined greeting card and decorative music box structure that includes a flat rectangular box formed from a resilient polymerized resin that is removably closed by a cover that on a first side supports a wind-up music producing mechanism within a confined space defined by the box and cover. A second side of the cover removably supports a greeting card. A panel bearing a decorative insignia is pivotally supported from the box, with the panel when in a first position overlying the cover and concealing the greeting card. When the panel is pivoted to a second position the music producing mechanism is actuated and the greeting card is visible. The panel is illustrated as a picture frame that removably supports a picture defined on a dimensionally stable sheet of material.

2 Claims, 5 Drawing Figures

COMBINED GREETING CARD AND MUSIC BOX STRUCTURE

BACKGROUND OF THE INVENTION

1. Field of the Invention

Combined Greeting Card, Music Box Structure and Picture Frame.

2. Description of the Prior Art

On many occasions it is desirable to do more for a person than merely sending the person a greeting card congratulating him on a particular occassion, hoping for an early recovery from an illness or the like. This desire is normally expressed by forwarding the person an inexpensive gift that will normally be sent separate and apart from the greeting card. The selection of an inexpensive gift is troublesome and time-consuming, as is the preparation of the gift for shipment.

The primary purpose in devising the present invention is to supply a combined greeting card and music box structure that is compact, light in weight, may be easily and conveniently sent through the mail to a recipient, is attractive in appearance, will provide entertainment to the person receiving the same, one that permits a greeting card carrying a desired message to be inserted therein, and the greeting card capable of being removed from the structure by the recipient should he so desire.

Another object of the invention is to supply a combined greeting card and music box structure in which the major components thereof may be inexpensively injection molded from a polymerized resin, and one in which each of the components serves to provide a number of functions.

SUMMARY OF THE INVENTION

The invention includes a flat rectangular box and a cover that removably closes the latter. The cover on a first side supports a conventional wind up music producing device within a confined space defined by the box and cover. A second side of the cover serves to removably support a greeting card that carries a desired message thereon. A panel is pivotally supported from the box, with the panel when in a first position overlying the greeting card and consealing the same. The panel carries a decorative insignia on a first side thereof that is visible when the panel is in a first position. When the panel is pivoted to a second position the greeting card is visible and the music producing mechanism is actuated.

The cover performs a number of separate functions. The cover serves as a removable support for the greeting card, as a support for the music producing mechanism, and in cooperation with the box provides a resonator that amplifies the sound of music emanating from the music producing mechanism. The rectangular panel also serves a number of functions. The panel serves as a support for the decorative insignia, to conceal the greeting card when in a first position, and to actuate the music producing mechanism when the panel is pivoted to a second position.

DESCRIPTION OF THE PREFERRED EMBODIMENT

Figure 1:
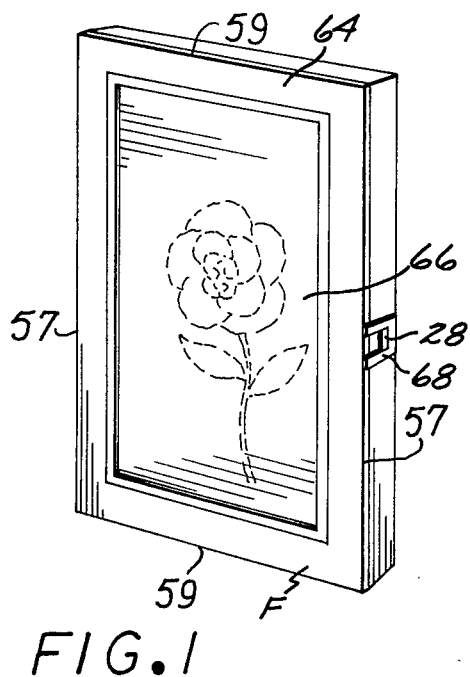
FIG. 1 is a perspective view of the combined greeting card and music box structure when the insignia defining panel is in a first position.

The invention A is illustrated in the drawing as being defined by a shallow rectangular box B, preferably injection molded from a resilient polymerized resin, and the box including a back 10, a pair of end walls 12, and first and second side walls 14 and 16. A first forwardly disposed surface 10a of back 10 has a number of diagonally disposed ribs 18 thereon that merge at their inwardly disposed ends in a centrally disposed body 20 that has a cavity 22 extending rearwardly therein. Three ribs 24 extend forwardly from the surface 10a and in cooperation with second side wall 16 and back 10 has a number of diagonally disposed ribs 18 thereon that merge at their inwardly disposed ends in a centrally disposed body 20 that has a cavity 22 extending rearwardly therein. Three ribs 24 extend forwardly from the surface 10a and in cooperation with second side wall 16 and back 10 cooperate to define an enclosure 26, the purpose of which will later be explained. A centrally positioned protuberance 28 extends outwardly from second side wall 16. The ribs 18 and 24 may be seen in FIG. 3 and have a depth substantially less than that of the end walls 12 and first and second side walls 14 and 16.

Figure 2:
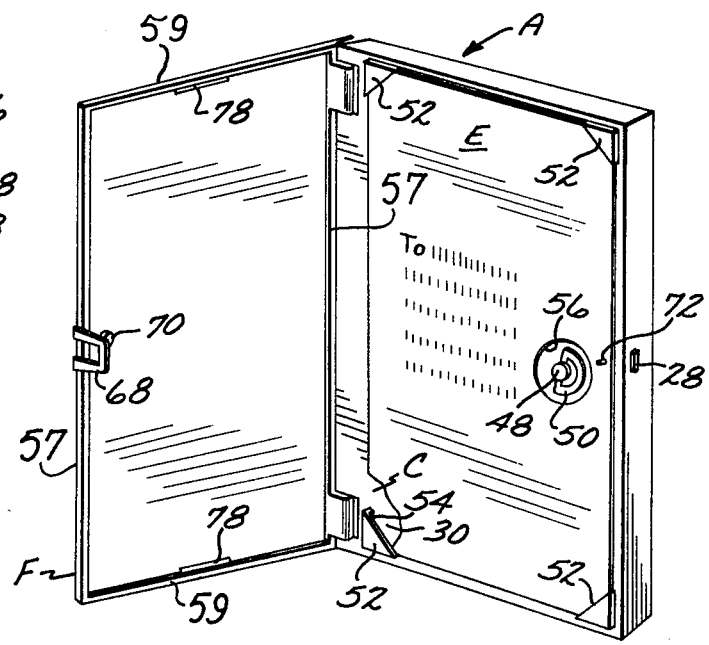
FIG. 2 is a second perspective view of the invention with the panel pivoted to a second position to expose the greeting card and actuate the music producing mechanism.
Figure 3:
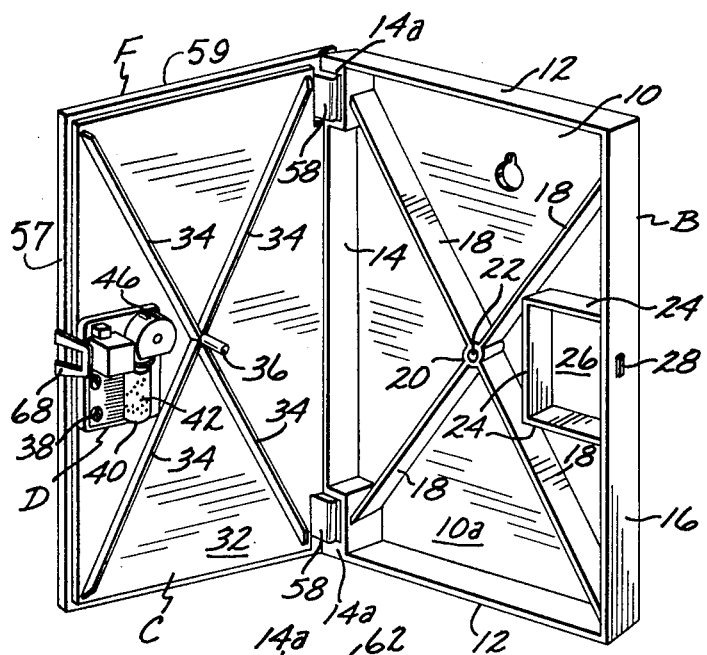
FIG. 3 is a perspective view of the invention with the cover removed, and the cover resting against the panel.

A rectangular cover C is provided as shown in FIGS. 2 and 3 that has a forward surface 30 and rearward surface 32. The cover C has shallow diagonally disposed reinforcing ribs 34 projecting from the rearward surface thereof as shown in FIG. 3, as well as a centrally disposed pin 36. The cover C is of such size that it fits snugly and removably within the confines of the box B when pin 36 frictionally and removably engages cavity 22, with the reinforcing ribs 18 and 34 being in abutting contact.

A conventional music producing mechanism D that is spring actuated is mounted on the second surface 32 of cover C in such a manner that the mechanism is disposed in enclosure 26 when pin 36 is in full engagement with cavity 22. Mechanism D is held in position on cover C by screws or other suitable fastening means. Mechanism D is of the type in which a spring actuated cylinder 40 having prongs 42 thereon rotates, with the prongs 42 contacting springs 44 to effect music. A spring actuated motor 46 drives the cylinder 40, with the motor having a wind-up stem 48 that projects forwardly through an opening in the cover C. The forward end of stem 48 has a handle 50 pivotally supported thereon as shown in FIG. 2.

The forward surface 30 of cover C has four spaced triangular shaped tabs 52 molded as a part thereof, and spaced outwardly from first surface 30 to define slits 54 with the latter. Corner portions of a rectangular greeting card may be removably disposed in the slits 54 to hold the card in abutting contact with the forward surface 30 of cover C. An opening 56 is formed in card C in alignment with handle 50 to permit motor 46 to be wound while the card E remains in place on cover C.

Figure 5:
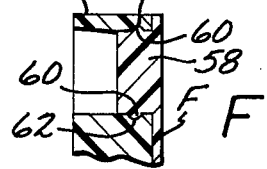
FIG. 5 is a fragmentary cross-sectional view of the invention taken on the line 5—5 of FIG. 4.

A rectangular panel F that is illustrated in the form of a picture frame is provided of substantially the same dimensions as the box B. The picture frame defining panel F is illustrated as being formed from a pair of parallel side pieces 57 and a pair of parallel end pieces 59, that cooperate to define an opening 61 within the confines thereof. One of the side pieces 57 has two spaced hinge members 58 molded as a part thereof, with each hinge member including two oppositely extending dimples 60 that engage cavities 62 formed in recessed portion 14a of first side wall 14 as shown in FIGS. 3 and 5. At least two spaced clips 78 are formed on the rearward portion of panel F as shown in FIG. 1. An opaque sheet 64 of relatively stiff material and of a greater width and length than the opening 61 is removably gripped by the clips and held in abutting contact with the rearward surfaces of side pieces 57 and end pieces 59. Sheet 64 has a picture or decorative insignia 66 on the forward surface thereof, which picture or insignia is visible through opening 61. Panel F has a U-shaped hasp 68 molded as a part thereof that removably engages protuberance 28 when the panel is in the first position shown in FIG. 1. The hasp 68 and protuberance 28 cooperate to maintain the panel F in a first position as shown in FIG. 1 until such time as the recipient pivots the panel to the second position shown in FIG. 2.

Figure 4:
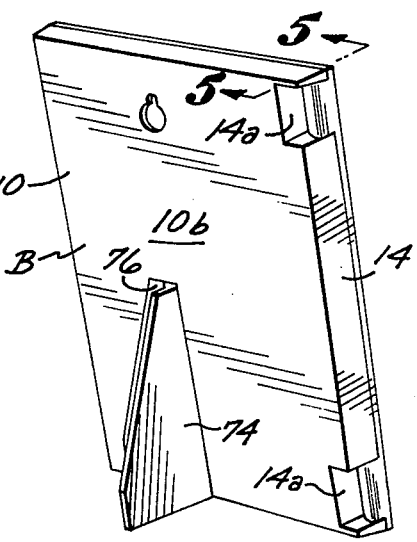
FIG. 4 is a perspective view of the rear of the invention.

When panel F is in the first position, a protuberance 70 thereon pressure contacts a spring-loaded actuator pin 72. Pin 72 controls operation of motor 46. When the pin 72 is pressed inwardly the motor will not operate. However, when panel F is pivoted to the second position shown in FIG. 2 the spring-loaded pin 72 automatically moves to a position when motor 46 operates and the mechanism D produces music. The box B pivotally supports a generally triangular shaped rest 74 that may be pivoted to a rearwardly extending position as shown in FIG. 4 to maintain the invention in an upright position on a horizontal supporting surface (not shown). When the rest 74 is not in use it may be pivoted into an opening 76 in back B, and be disposed flush with the latter.

From the above description it will be seen that the cover C serves a number of functions, namely, a support for mechanism D, a support for greeting card E, and cooperates with box B to provide a resonator to amplify the sound of music produced by the mechanism D.

Likewise the panel F serves a number of functions. Panel F provides a support for the decorative insignia bearing sheet 66, conceals greeting card E when in a first position, and also automatically controls operation of the music producing mechanism D.

The use and operation of the invention has been described previously in detail and need not be repeated.

I claim:

1. A combined greeting card and music box structure that includes:
   a. a spring actuated music box mechanism that has first and second oppositely disposed side surfaces, and a spring loaded actuator pin that projects outwardly from said first surface and normally occupies a first position where it prevents operation of said music box mechanism, but said actuator pin when allowed to move to a second position causing said spring actuated music box mechanism to operate;
   b. a box formed from a resilient material, which box includes a back that has a forward and rearward surface, and a continuous side wall that extends forwardly from said back;
   c. a greeting card;
   d. a cover that closes and cooperates with said box to define a confined space, said cover having first and second side surfaces said cover having said spring actuated music box mechanism secured to said first side surface and extending into said confined space and said actuator pin extending forwardly from said mechanism through an opening in said cover beyond said second side surface, said cover having said greeting card mounted on said second side surface thereof, with said back and cover including a plurality of reinforcing ribs that extend towards one another from said forward surface and said first side surface that are in abutting contact, and said box, cover and reinforcing ribs cooperating to provide a resonator to amplify music from said music box mechanism when said actuator pin is allowed to move to said second position;
   e. an opaque panel that has first and second sides, said panel including a decorative insignia visible from said first side thereof;
   f. hinge means for pivotally supporting said panel from said box, said panel when in a first position overlying said greeting card and with said second side pressure contacting said spring loaded pin to maintain the latter in said first position, and said panel when pivoted to a second position allowing said greeting card to be viewed and permitting said spring-loaded pin to move to said second position to allow said spring-actuated music box mechanism to operate; and
   g. first means for removably locking said panel in said first position on said box to overlie said greeting card.

2. A combined greeting card and music box structure as defined in claim 1 which in addition includes:
   h. second means on said back that extend rearwardly therefrom to rest on a horizontal surface and support said combined greeting card and music box structure in an upright position on the latter.

* * * * *